Jan. 29, 1963 R. L. LARSON ET AL 3,076,110
DYNAMOELECTRIC MACHINE
Filed May 26, 1958 2 Sheets-Sheet 2
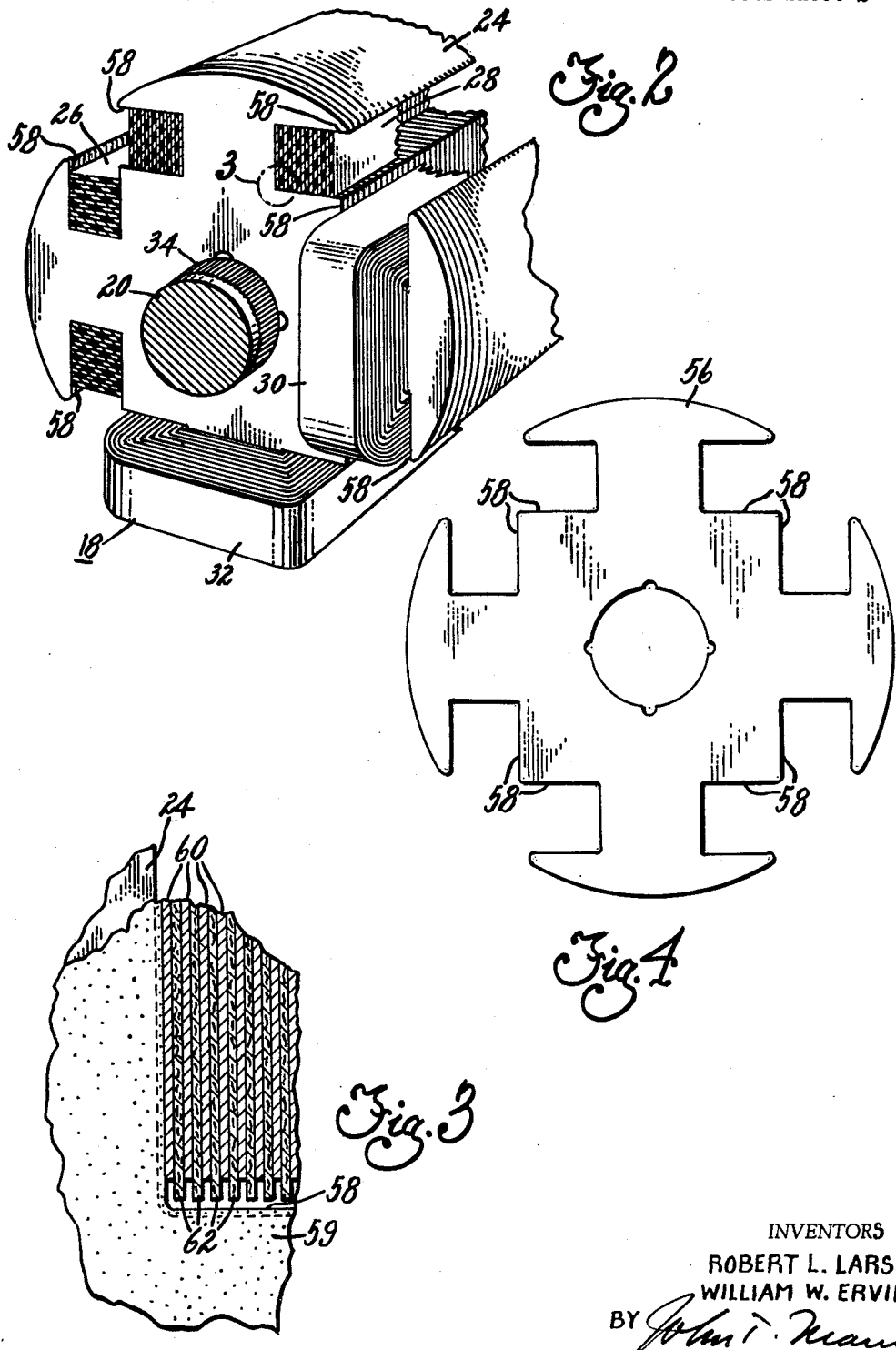
INVENTORS
ROBERT L. LARSON
WILLIAM W. ERVIN
BY
THEIR ATTORNEY United States Patent Office 3,076,110
Patented Jan. 29, 1963

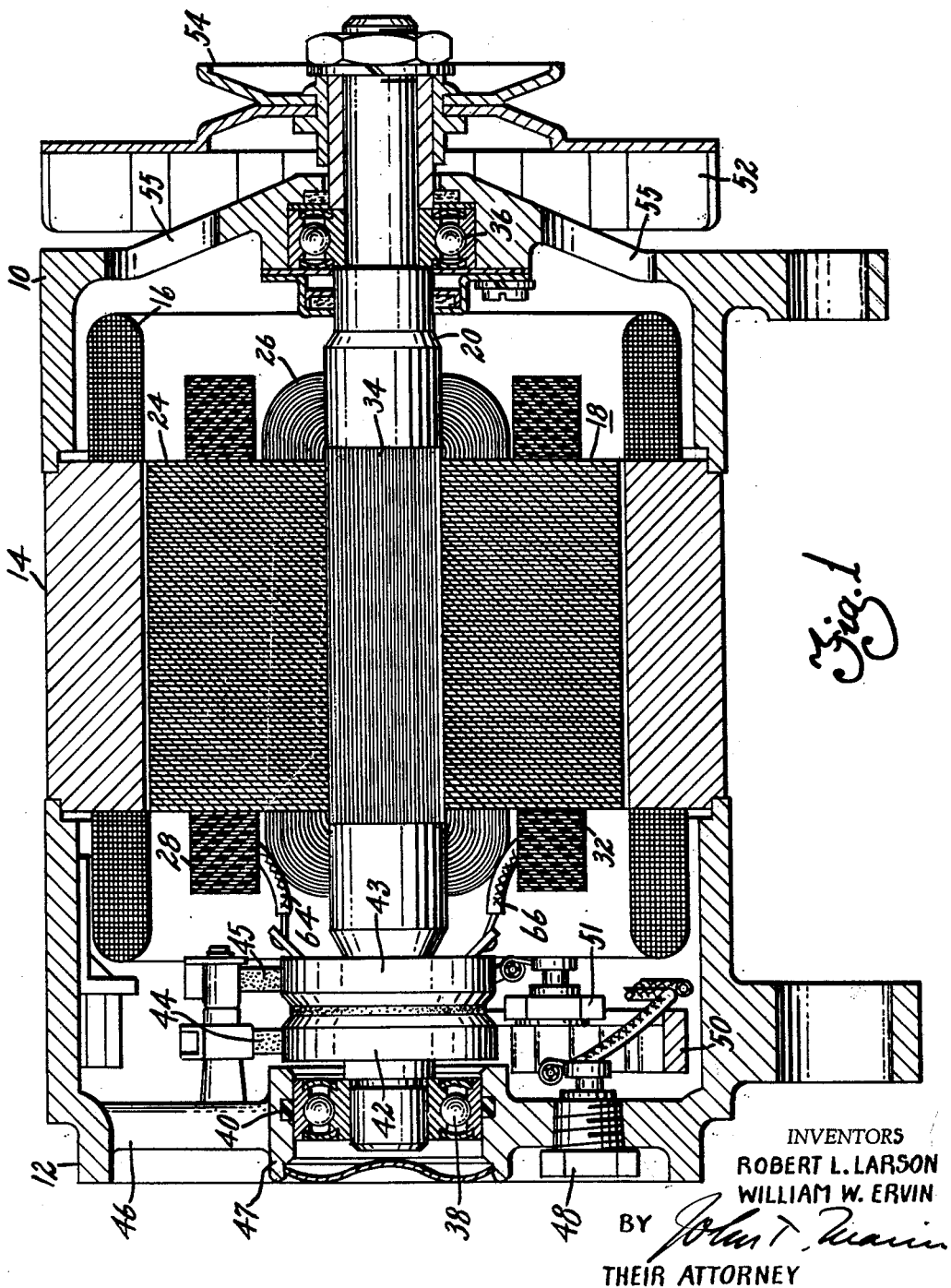

1

3,076,110
DYNAMOELECTRIC MACHINE
Robert L. Larson, Anderson, and William W. Ervin, Alexandria, Ind., assignors to General Motors Corporation, Detroit, Mich., a corporation of Delaware
Filed May 26, 1958, Ser. No. 737,801
2 Claims. (Cl. 310—194)

This invention relates to dynamoelectric machines and is more particularly concerned with rotor structures of electrical equipment.

It has been common practice, in the past, to fabricate rotors of dynamoelectric machines by placing sheets of heavy insulating material on a core member and then winding the rotor member with copper wire of cylindrical cross section. Although this sort of construction has satisfied the needs of many installations, it has disadvantages where size, weight, and cost of the machine are at a premium such as on motor vehicle and aircraft installations.

In contrast to the above-described construction, it is an object of this invention to provide a dynamoelectric machine wherein the rotor is wound with metal foil having a large width as compared with its thickness. The use of metal foil and particularly aluminum foil provides for a winding which is lighter in weight and lower in cost than windings formed of copper wire. Because of these advantages, the over-all weight and cost of the dynamoelectric machine made in accordance with this invention may be greatly reduced when compared with prior constructions. The moment of inertia of the rotor is also reduced when aluminum foil is used, thus reducing the size of pulleys, belts and couplings used with the generator.

Another object of this invention is to provide a rotor for a dynamoelectric machine wherein the laminated core is coated with a layer of tough, plastic insulating material that is coextensive with the core and wherein a metal foil winding is wound over the core and against the plastic coating. With this construction, the need for sheets of heavy insulating material is eliminated as the plastic coating forms an electrical insulating layer between the core and metal foil winding. The foil winding is wound flat against the plastic coating and thus has no tendency to cut through the coating at the point where the foil material is wound over the coated edges of the rotor.

Further objects and advantages of the present invention will be apparent from the following description, reference being had to the accompanying drawings wherein preferred embodiments of the present invention are clearly shown.

In the drawings:

FIGURE 1 is a vertical cross-sectional view of a dynamoelectric machine made in accordance with this invention.

FIGURE 2 is a perspective view of a rotor made in accordance with this invention.

FIGURE 3 is an enlarged view of a portion of the rotor shown in FIGURE 2 and showing the relationship of the core, plastic coating and foil winding.

FIGURE 4 is a plan view of one of the laminations of the rotor of this invention.

Referring now to the drawings and more particularly to FIGURE 1, the dynamoelectric machine of this invention comprises end frames 10 and 12 which are separated by the usual annular ring of stator iron 14. The end frames 10 and 12 are preferably formed of die cast aluminum and are held fixed to the stator iron 14 by means of one or more through bolts, not shown. The stator iron carries an output winding 16 that is preferably of the three-phase type.

2

The rotor assembly of the dynamoelectric machine is generally designated by reference numeral 18 and includes a shaft 20, a laminated core 24, and coil windings 26, 28, 30 and 32 which are better illustrated in the perspective view of FIGURE 2. The laminated core 24 is held to the shaft 20 by means of the knurled portion 34 formed on the shaft, the edges of the knurls biting into the laminated core when the core is assembled to the shaft. The laminations could be held to the shaft by other means such as by a tapered press fit or by the use of keys and the like as is well known to those skilled in the art.

The shaft 20 of the rotor assembly is journalled in ball bearings 36 and 38 located respectively in end frames 10 and 12. The outer race of ball bearing 36 is press-fitted in the end frame 10 whereas the outer race of bearing 38 fits tightly against an annular ring of resilient material such as rubber or a synthetic material 40 that is fitted within an annular slot formed in end frame 12. The shaft 20 carries slip rings 42 and 43 which are suitably insulated from each other and which rotate with the shaft. These slip rings cooperate with brushes 44 and 45 which serve to supply direct current to the field winding of the generator which is comprised of coil windings 26, 28, 30 and 32.

The end frame 12 is formed of radially extending webs 46 which connect the outer periphery of the end frame and the bearing supporting portion 47. These webs receive rectifier plugs 48 which are threaded into the end frames in a manner more fully shown and described in copending application, S.N. 705,206, filed on December 26, 1957, and assigned to the assignee of the present application. The rectifier plugs are constructed as set forth in that application. A subframe 50, like that shown in application S.N. 705,206 carries a plurality of rectifier plugs 51 in a manner fully described in the above-noted application. These rectifier plugs are preferably connected with the output winding 16 of the generator in a fashion described in the above-identified copending application. Thus, the rectifiers are preferably connected in a three-phase, full wave bridge rectifier network.

The shaft 20 carries a fan 52 which is rotatable with the shaft and with a pulley 54 that is belt-driven from the engine of a motor vehicle or the like. The fan pulls air through the openings located between webs 46 of end frames 12, between the coils on the rotor, between the stator and rotor of the generator and thence through openings 55 formed in end frame 10. When the fan is operating, it also pulls air over the rectifier plugs 48 and 51 to maintain them cool and pulls air over the webs 46 and subframe 50 to maintain these two parts cool. It will be appreciated that heat generated in the rectifier plugs 48 and 51 is transferred respectively to webs 46 and subframe 50 where the heat is transferred to the cooling air passing thereover.

The rotor construction of the above-described alternating current generator is an important feature of this invention. This rotor comprises the shaft 20 which is fitted with a stack of steel laminations of the type shown in FIGURE 4 and designated individually by reference numeral 56. As has been noted hereinbefore, the stack of laminations is held to the shaft 20 by the knurled portion 34 of the shaft 20. The laminated core designated as a whole by reference numeral 24 has a tough plastic coating thereon designated by reference numeral 59. This coating is formed of nylon, polyethylene, epoxy resin or similar material, or may be formed of a combination of epoxy resin and mica of a formulation set forth in copending application, S.N. 737,782, filed May 26, 1958 and assigned to the assignee of the present invention. Where the coating is a combination of epoxy resin and mica, it may be formed as set forth in either Example I or II of application S.N. 737,782.

Whether the rotor is coated with polyethylene, epoxy resin, nylon or a combination of epoxy resin and mica, it is preferabyy applied to the laminated core in a manner described in copending application S.N. 737,782. Thus, the coating operation may be performed by placing a suitable quantity of powdered plastic material in a compartment or tank wherein a fluid vehicle such as air or other nonreactive gaseous fluid is blown through a bed of the particles causing the particles to become fluid-like in nature and to be suspended in a turbulent cloud or layer wherein the powder is maintained suspended by means of the ascending flow of fluid. The rotor is heated to a temperature of preferably about 400° F. (above the melting point of the plastic material used) and is suspended in this fluidized material. Particles of the plastic material which impinge on the hot core are at least superficially melted at their points of contact with the core and are adhered thereto whereby the entitre core is coated uniformly with the powder. The period of time through which the fluidizing process is carried out determines to a large degree the thickness of the coating to be deposited. After the laminated core is removed from the fluidizing chamber, it is preferably heated to a temperature in the order of 400° F. for about one hour to fully cure the coating and to densify the same. We prefer to utilize coatings in the order of .010 inch thick although this thickness may vary depending on the rotor construction being fabricated, and the material used in coating the rotor. The coating material extends coextensively with the entire outer surface of the laminated core including the side walls of the slots 58 which receive the rotor windings. The end laminations of the core are also fully coated while the shaft 20 of the rotor assembly is preferably masked over a predetermined length to prevent coating of portions of it.

The coil windings 26, 28, 30 and 32 are formed of interleaved layers of metal foil such as aluminum foil and paper or other insulating material, or the windings may be formed of foil with an insulating coating or a surface conversion type coating with no separate insulating media between layers of foil. The aluminum foil, in FIGURE 3, is designated by reference numeral 60 whereas the paper is designated by reference numeral 62. It is noted that the aluminum foil winding directly contacts the plastic coating 59 on the laminated core. The layers of aluminum foil and insulating paper have a large width as compared to their thickness. As an example, the aluminum foil may have a thickness in the neighborhood of .005 inch and a width of .542 inch whereas the paper preferably has a thickness of .00025 inch and a width of .594 inch. These dimensions may be varied without departing from the scope of this invention, but it is important that the windings have a large width as compared to their thickness. The coil windings 26, 28, 30 and 32 are wound on a laminated core to form the structure shown in FIGURE 2. These coil windings are preferably connected in series with one another by electrical connections preferably made by cold welding or ultrasonic welding, not shown, and are connected with slip rings 42 and 43 by leads 64 and 66. The brushes 44 and 45 are, of course, connected with a suitable direct current voltage supply and may be energized from the output of rectifiers 48 and 51.

It will be appreciated that, with the rotor structure just described, the aluminum foil material 60 is insulated from the core 24 by means of the tough plastic coating that is adhered directly to the core. Thus, there is no need to provide heavy insulation for the slots 58 formed in the laminated core nor is it necessary to place insulation over the end laminations of the core, the plastic electric insulating material being the sole insulating material being provided between the windings and the laminated core. This construction provides a very compact rotor winding and one which is relatively cheap in cost and light in weight.

It will be appreciated that the alternating current machine just described is of the four-pole type, the rotor assembly being the rotatable field of the machine. The output of the generator is taken off the three-phase stator winding 16 as is well known to those skilled in the art and, in this particular case, it is connected with rectifiers 48 and 51. It will be apparent to those skilled in the art, however, that the output from stator winding 16 could be supplied to any other type of load that is desired to be energized and that the features of this invention can be applied to any type of dynamoelectric machine having a rotatable rotor assembly.

While the embodiments of the present invention as herein described constitute preferred forms, it is to be understood that other forms might be adopted.

What is claimed is as follows:

1. A rotor for a dynamoelectric machine comprising, a shaft, a core carried by said shaft formed of a plurality of steel laminations, said core having a pair of oppositely disposed parallel slots each defined by planar sidewalls and a planar bottom wall and having end faces located normal to the walls defining said slots, a rectangular coil winding carried by said core having portions fitting within said slots and portions overlying the end faces of said core, said coil winding being formed of interleaved layers of metal foil and insulating material with the edges of the foil in the slots being normal to the sidewalls defining the slots, and a relatively thin coating of tough plastic material bonded directly to said core, said coating covering and extending coextensively with the bottom and side walls of said slots and the end faces of said core to prevent a short circuit connection between the metal foil of the coil winding and the core.

2. In combination, a core member formed of steel laminations, said core member having flat end faces and a pair of slots defined by sidewalls and a bottom wall that are normal to said end faces, a rectangular coil winding having portions fitting within said slots and portions extending across said end faces, said coil winding being formed of interleaved layers of metal foil and insulating material with the exposed edges of the metal foil of the portion of the winding in the slots facing the sidewalls of the slots, and a relatively thin coating of tough plastic material bonded directly to said core, said coating covering and extending coextensively with the bottom and sidewalls of said slots, the end faces of said core and the corners defined by the junction of the bottom walls of said slots and the end faces of said core.

References Cited in the file of this patent

UNITED STATES PATENTS

| 764,481 | Fitchfield | July 5, 1904 |
| 2,130,843 | Hill et al. | Sept. 20, 1938 |
| 2,648,018 | Meier | Aug. 4, 1953 |
| 2,695,969 | Yates | Nov. 30, 1954 |
| 2,714,173 | Wiseman | July 26, 1955 |

FOREIGN PATENTS

| 4,425 | Great Britain | of 1888 |